(12) United States Patent
Legg et al.

(10) Patent No.: US 9,372,310 B1
(45) Date of Patent: Jun. 21, 2016

(54) FREE SPACE FIBRE-TO-FIBRE COUPLING USING OPTICAL FIBRES BELOW CUT-OFF

(71) Applicant: Gooch and Housego PLC, Ilminster, Somerset (GB)

(72) Inventors: Thomas Legg, Torquay (GB); Norman Fisher, Torquay (GB); Adrian Norman, Plymouth (GB)

(73) Assignee: Gooch and Housego PLC, Somerset (GB)

( * ) Notice: Subject to any disclaimer, the term of this patent is extended or adjusted under 35 U.S.C. 154(b) by 25 days.

(21) Appl. No.: 14/577,541

(22) Filed: Dec. 19, 2014

(51) Int. Cl.
*G02B 6/26* (2006.01)
*G02B 6/32* (2006.01)

(52) U.S. Cl.
CPC ............... *G02B 6/262* (2013.01); *G02B 6/264* (2013.01); *G02B 6/32* (2013.01)

(58) Field of Classification Search
None
See application file for complete search history.

(56) References Cited

U.S. PATENT DOCUMENTS

| | | |
|---|---|---|
| 6,324,326 B1 | 11/2001 | Dejneka et al. |
| 8,094,982 B2 | 1/2012 | Wu et al. |
| 2003/0169965 A1 | 9/2003 | Hanada |
| 2004/0062478 A1* | 4/2004 | Ludington ........... G02B 6/2937 385/33 |
| 2009/0257714 A1 | 10/2009 | Zhang et al. |

FOREIGN PATENT DOCUMENTS

| | | |
|---|---|---|
| EP | 1406100 | 4/2004 |
| JP | H08286076 | 11/1996 |

OTHER PUBLICATIONS

Schäfter + Kirchhoff GmbH, RGBV Fiber Optics, Specially designed for fluorescence microscopy, confocal microscopy and quantum optics, Nov. 2014, pp. 51-53.

* cited by examiner

*Primary Examiner* — Jerry Rahll
(74) *Attorney, Agent, or Firm* — Jetter & Associates, P.A.

(57) ABSTRACT

A method of free space fiber-to-fiber coupling includes providing a first optical fiber and a second optical fiber spaced apart from one another by a free space distance having a pair of spaced-apart achromatic collimating lenses within the free space distance. Essentially single mode light is launched from the first fiber at a wavelength λ or a range of λs that provides at least a portion of its light at wavelength(s) below a cut-off wavelength for the first fiber. The first optical fiber and second optical fiber are both <50 m and sufficiently short to provide essentially single mode operation. The essentially single mode light after the launching propagates as free space light through said free space distance and is received by and propagates in the second optical fiber as essentially single mode light.

13 Claims, 5 Drawing Sheets

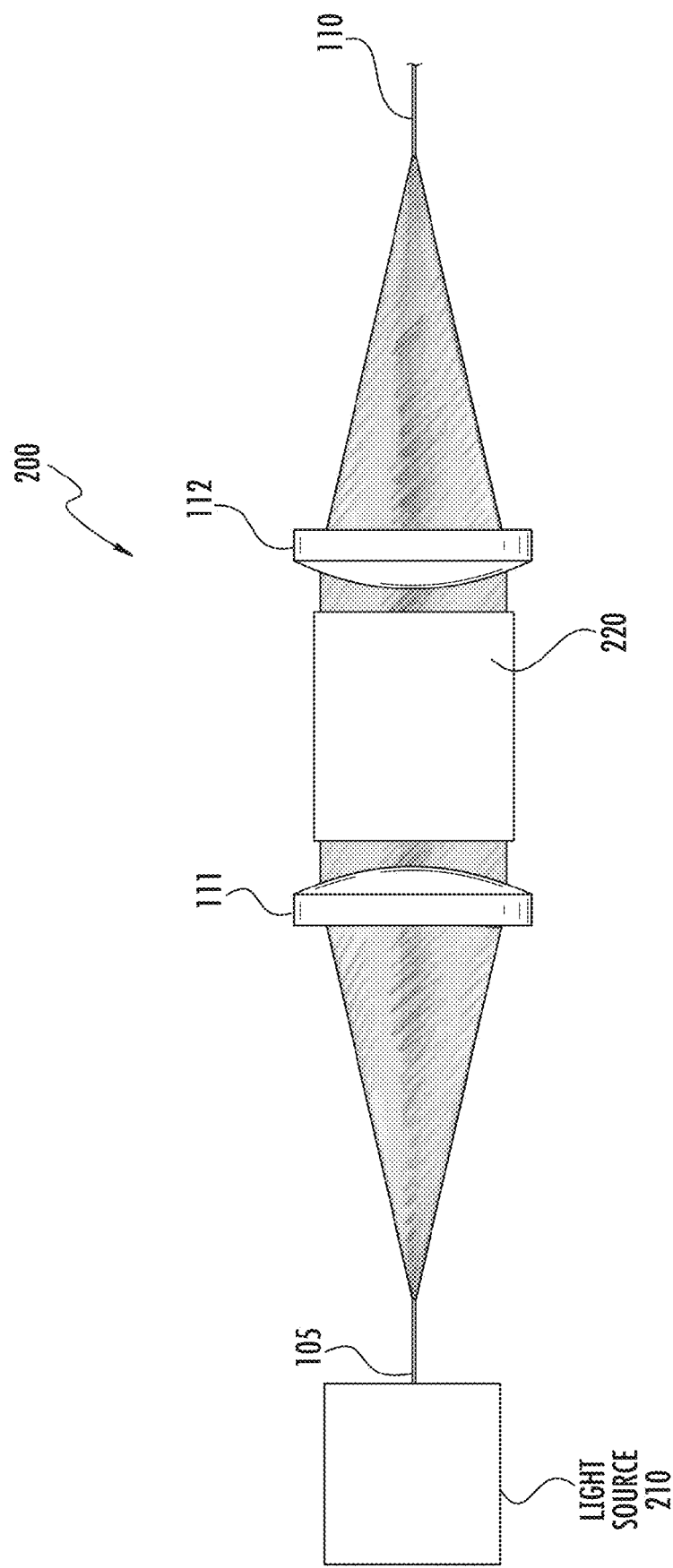

FREE SPACE FIBRE-TO-FIBRE COUPLING USING OPTICAL FIBRES BELOW CUT-OFF

FIELD

Disclosed embodiments relate to fibre-to-fibre coupling in optical devices and systems.

BACKGROUND

Single mode optical fibres are designed to support only a single propagation mode per polarization direction for a given wavelength. Single mode optical fibres usually have a relatively small core diameter (e.g., a diameter of only a few micrometers) and a small refractive index difference between the core and cladding. The mode radius is typically a few microns. Mode field diameter is one of the unique characteristic of single mode fibres as is cut-off wavelength. The cut-off wavelength is the wavelength above which the optical fibre will allow only single mode transmission (multiple modes cease propagation), and below the cut-off wavelength multimode transmission starts.

Fibre-to-fibre coupling using collimating lenses through a free space component over a large spectral range (broadband) is fundamentally difficult because of the change in the mode field diameter (MFD) of the fibre with wavelength, and hence its corresponding change in output/acceptance angle (numerical aperture (NA)), which can change the collimating profile of light exiting the collimating lens thus compromising coupling efficiency. There are believed to be no known solutions to this problem.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize a fibre/collimating optical system in which the mode field diameter (MFD) change is desensitized to wavelength changes enables improved free space coupling across an extended wavelength range. Desensitization to wavelength changes has been found to be achieved by operating a fibre in which the propagating wavelengths used in the optical system include wavelength(s) that are below the fibre's cut-off wavelength (rather than above the cut-off as in conventional use), which has been unexpectedly found to desensitize to wavelength changes and maintain essentially single mode propagation if certain conditions described herein are met.

One condition for obtaining essentially single mode operation below the cut-off wavelength of the fibres is by having the length of the respective fibres kept relatively short. As used herein, "sufficiently short to provide essentially single mode operation" refers to fibre lengths of ≤50 m, where the fibre lengths can generally range from about 1 m to 40 m. As used herein "essentially single mode operation" refers to operating below cut-off but only allowing a single mode to propagate which is achieved by controlling the launch conditions of the light to excite only the lowest order fibre mode and by avoiding significant perturbations to the fibre (e.g., excessive bending) which may excite higher order modes by coupling light from the lowest order mode. The main determinant in recognizing a maximum fibre length to ensure essentially single mode operation while operating below the cut-off wavelength is to consider how far below cut-off system operation is taking place, with operation further below cutoff generally being provided with a shorter fibre length.

Beside the transmit fibre, the receive fibre should also generally be relatively short to ensure essentially single mode propagation. However the respective fibres can be spliced after the device to a compatible fibre with a lower cut-off wavelength providing robust single mode operation. The respective fibres should also generally be unperturbed which involves avoiding bends, twists or pressure applied to the fibres. The protection to perturbation again depends on how far below cut-off operation is taking place. Disclosed use of a fibre(s) below its cut-off has also been found to reduce the spectral variation of the fibre MFD and thus the numerical aperture (NA) which represents unconventional operating in the fundamental mode in a multimode (few-moded) regime.

BRIEF DESCRIPTION OF THE DRAWINGS

Reference will now be made to the accompanying drawings, which are not necessarily drawn to scale, wherein:

FIG. 2A shows an example optical system having free space fibre-to-fibre coupling using optical fibres operated below cut-off optical device(s) having an optical device positioned between achromatic collimating lenses, according to an example embodiment.

DETAILED DESCRIPTION

Figure 1:
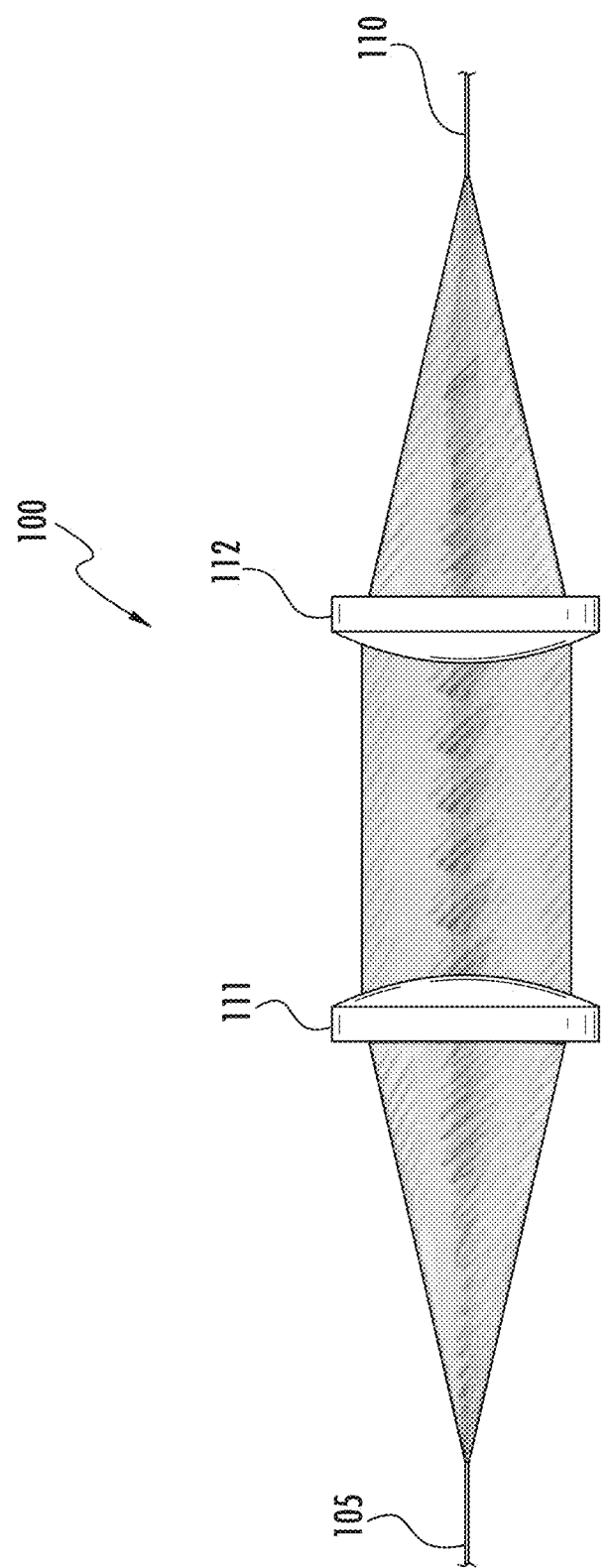
FIG. 1 shows an example optical system having free space fibre-to-fibre coupling that can benefit from disclosed embodiments, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Disclosed embodiments include methods of free space fibre-to-fibre coupling using at least one of the fibres operated with wavelength(s) below cut-off for the fibre. The fibres used for disclosed embodiments are referred to by some as "single mode optical fibres", which have a core diameter generally <12 µm, typically being between about 6 µm and 10.5 µm in diameter depending on propagating wavelength and the fibre's NA. System operation is in a regime where at least 2 modes can theoretically be supported by the fibre, but because of a controlled launch of the input light essentially only a single fundamental mode is excited. A "controlled launch" refers to the input light being matched spatially to the lowest order mode supported by the fibre so that only that lowest order mode is excited.

Disclosed methods of free space fibre-to-fibre coupling include providing a first optical fibre and a second optical fibre spaced apart from one another by a free space distance having a pair of spaced-apart achromatic collimating lenses within the free space distance. Essentially single mode light is launched from the first fibre at a wavelength λ or a range of λs that provides at least a portion of its light at wavelength(s) below a cut-off wavelength for the first fibre. The first optical fibre and second optical fibre are both <50 m and sufficiently short to provide essentially single mode operation. The essentially single mode light after the launching propagates as free space light through the free space distance is received by and propagates in the second optical fibre as essentially single mode light.

In a typical embodiment the fibres and collimating lenses on the transmit side and the receive side can be essentially identical to provide a symmetric optical system. FIG. 1 depicts an example optical system 100. The optical system 100 includes a first optical fibre 105 that can receive light (e, g., from a fibre laser) and provide an input to an optical device(s) within the optical system 100 and a second optical fibre 110 that can provide receive an output from the device(s) within the optical system 100, where the respective fibres are spaced apart from one another by a free space distance. The optical fibres 105, 110 can be polarization-maintaining (PM) optical fibres.

A pair of achromatic collimating lenses 111 and 112 is in the free space distance between the first optical fibre 105 and second optical fibre 110. The first optical fibre 105 and second optical fibre 110 are both sufficiently short to provide essentially single mode operation, having a maximum fibre length that as noted above is <50 m. The collimating lenses are 111 and 112 are achromatic lenses for correcting chromatic aberration. There is generally no limitation on the free space spacing distance used with disclosed embodiments.

FIG. 2A shows an example optical system 200 having free space fibre-to-fibre coupling using optical fibres operated below cut-off optical device(s) having an optical device 220 positioned between achromatic collimating lenses 111 and 112, according to an example embodiment. The optical device 220 is positioned between the achromatic collimating lenses 111 and 112 and can comprise a broadband optical filter, optical isolator, delay line, AOTF, polarizer, variable optical attenuator, or generally any bulk optical component. However, in some embodiments there are no optical device(s) between the achromatic collimating lenses 111 and 112, such as an optical communication that transmits modulated light over the air across the free space distance. A light source 210, such as a fibre laser, couples light into the first optical fibre 105.

Figure 2B:
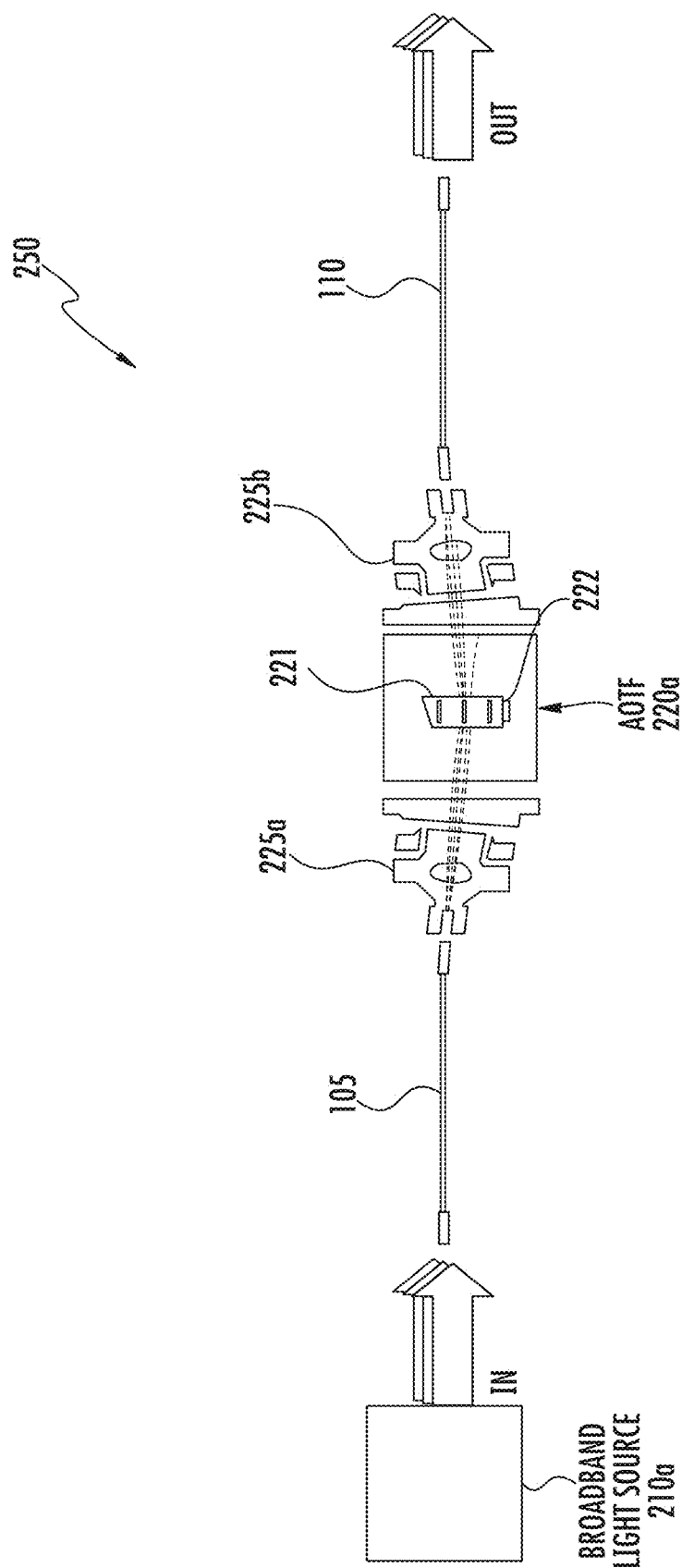
FIG. 2B shows an example fibre-coupled acousto-optic tunable filter (AOTF)-based system having free space fibre-to-fibre coupling using optical fibres operated below cut-off optical device(s) having an AOTF positioned between achromatic collimating lenses, according to an example embodiment.

FIG. 2B shows an example fibre-coupled AOTF-based system 250 having free space fibre-to-fibre coupling using optical fibres operated below cut-off having an AOTF 220a positioned between an input beam coupler 225a and an output beam coupler 225b, according to an example embodiment. As known in the art, an AOTF receives broadband light and launches an acoustic wave in its AO crystal 221 responsive to the applied RF signal shown as RF IN to the transducer 222 on its AO crystal 221 which functions as an electronically tunable spectral bandpass filter. Input beam coupler 225a and output beam coupler 225b both include an achromatic collimating lens. A broadband light source 210a couples light into the first optical fibre 105 and modulated light output exiting from the AOTF 220a is coupled into the second optical fibre 110 by the output beam coupler 225b. The broadband light source 210a has a bandwidth of at least 100 nm, typically about 400 nms to 500 nms.

EXAMPLES

Disclosed embodiments are further illustrated by the following specific Examples, which should not be construed as limiting the scope or content of this Disclosure in any way.

For PM460 fibre, the Thorlabs, Inc. (the Vendor) published cut-off wavelength is 420 nm±30 nm, and for PM630 fibre the Vendor' published cut-off wavelength is 570 nm±50 nm. The lenses used were single achromatic lenses with a focal length of about 2 mm. The fibre spacing was ~70 mm in free space and the fibre length was 1 m to 2 m. Use of a fibre below cut-off was unexpectedly found to reduce the spectral variation of both the fibre MFD and the NA. For example, the MFDs of PM460 and PM630 were measured at 658 nm and 455 nm. Both of these wavelengths are above cut-off in PM 460. For PM630 658 nm is above cut-off, but 455 nm is below its cut-off. The results are summarized in Table 1 below:

TABLE 1

| Output divergence angle and calculated MFD of PM460 and PM630 fibre at 455 nm and 658 nm | | | | |
|---|---|---|---|---|
| Wave-length | Output divergence angle | | Mode Field Diameter (MFD) | |
| (nm) | PM460 | PM630 | PM460 | PM630 |
| 455 | 5.16 | 4.39 | 3.20777E−06 | 3.77041E−06 |
| 658 | 3.78 | 4.85 | 6.33251E−06 | 4.93544E−06 |
| % change | −36.50793651 | 9.484536082 | 97.41147741 | 30.89928628 |

Figure 3A:
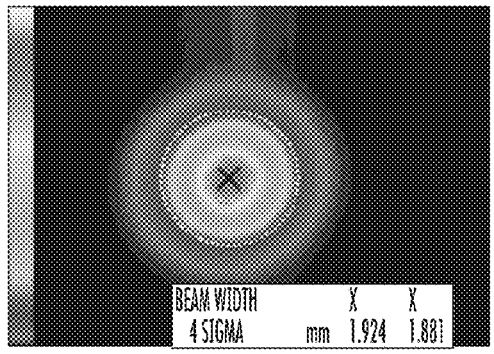
FIGS. 3A and 3B are scanned images of the resulting beam profiles from which measurements were taken from PM630 fibre output at a distance of 12.4 mm from the fibre end at 455 nm and 658 nm, respectively.
Figure 3B:
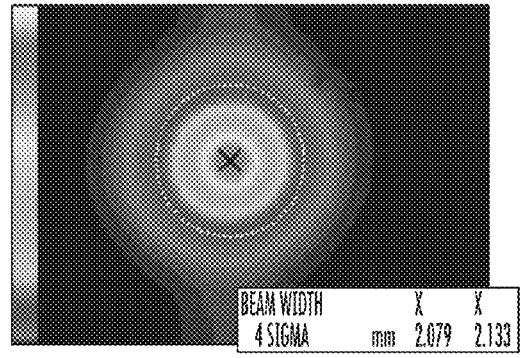
Figure 4A:
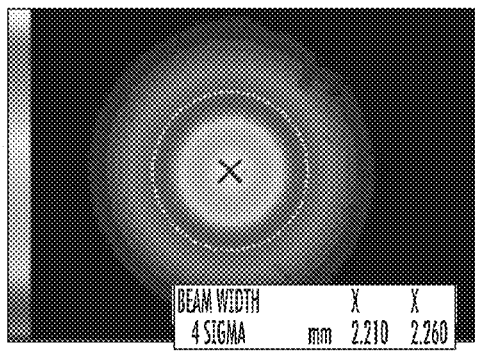
FIGS. 4A and 4B are scanned images of the resulting beam profiles from which measurements were taken from a PM460 fibre output at a distance of 12.4 mm from the fibre end at 455 nm and 658 nm, respectively.
Figure 4B:
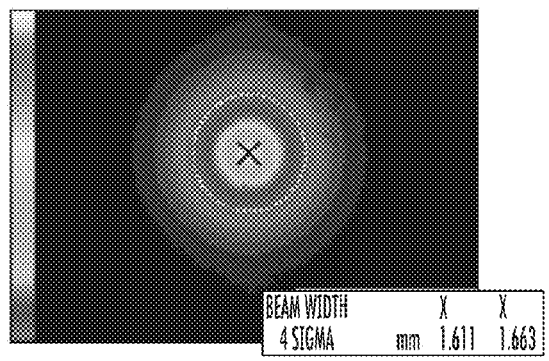

The values in Table 1 were calculated from measurements of the beam diameter made by a Charged-Coupled Device (CCD) beam profiler located about 12.4 mm from the fibre end-face. Scanned images of the beam profiles from which these measurements were taken are shown in FIGS. 3A, 3B, 4A and 4B. FIGS. 3A and 3B are scanned images of the resulting beam profiles from which measurements were taken from PM630 fibre output at a distance of 12.4 mm from the fibre end at 455 nm and 658 nm, respectively. FIGS. 4A and 4B are scanned images of the resulting beam profiles from which measurements were taken from a PM460 fibre output at a distance of 12.4 mm from the fibre end at 455 nm and 658 nm, respectively. The near circular dashed line shown in FIGS. 3A, 3B, 4A and 4B represents the 4 sigma beam width. The fibre launch for the 455 nm measurements were from a splice to a source pigtailed with PM460 fibre. The fibre launch for the 658 nm measurements was from a splice to a laser diode pigtailed with PM630.

Since at both 455 nm and 658 nm PM460 (FIGS. 4A and 4B) is conventionally above its cut-off wavelength, the output divergence of PM460 between 455 nm and 658 nm was found to decrease by around 37%. Since 455 nm is below cut-off for PM630 while 658 nm is above cut-off (FIGS. 3A and 3B), the output divergence of PM630 was found to increase by only 9% over the same spectral range. The MFD (calculated assuming Gaussian propagation from a beam waist at the fibre output) of PM460 conventionally both above cut-off almost doubles between 455 nm and 658 nm, whereas since 455 nm is below cut-off for PM630 (FIG. 3A) the MFD of PM630 was unexpectedly found to only increase by 31% between 455 nm and 658 nm. The result if the fibres were operated below cut-off at both wavelengths is expected to be the rate of change of MFD for the fundamental mode would slow (see D. Marcuse, "Loss analysis of single-mode fiber splices", Bell Syst. Tech. J. 56, 703 (1977)).

Figure 5:
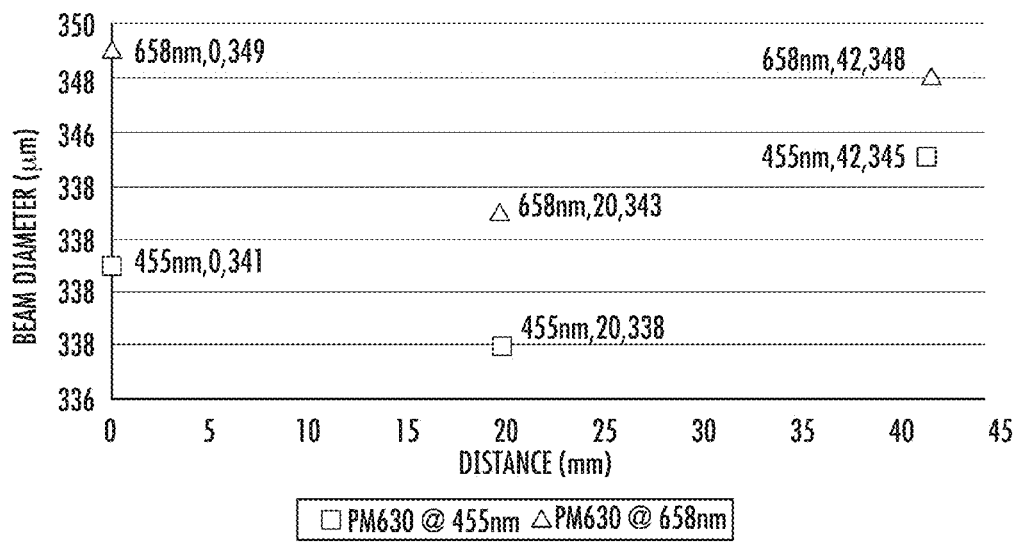
FIG. 5 is a plot of beam diameter (in µm) vs. distance (in mms) for a collimator constructed using PM630 fibre.

FIG. 5 is a plot of beam diameter (in μm) vs. distance from a collimator (in mms) constructed with PM630 fibre. The data shown evidences that a PM630 fibre and achromatic lens with a fixed distance between them can produce a collimated beam at both 455 nm (below cut-off wavelength) and 658 nm (above the cut-off wavelength). The beams were not collimated in the sense of aiming for minimum divergence, instead they were built to have a beam waist at around 20 mm to improve the coupling between collimators with a collimator-to-collimator spacing of 40 mm.

Figure 6:
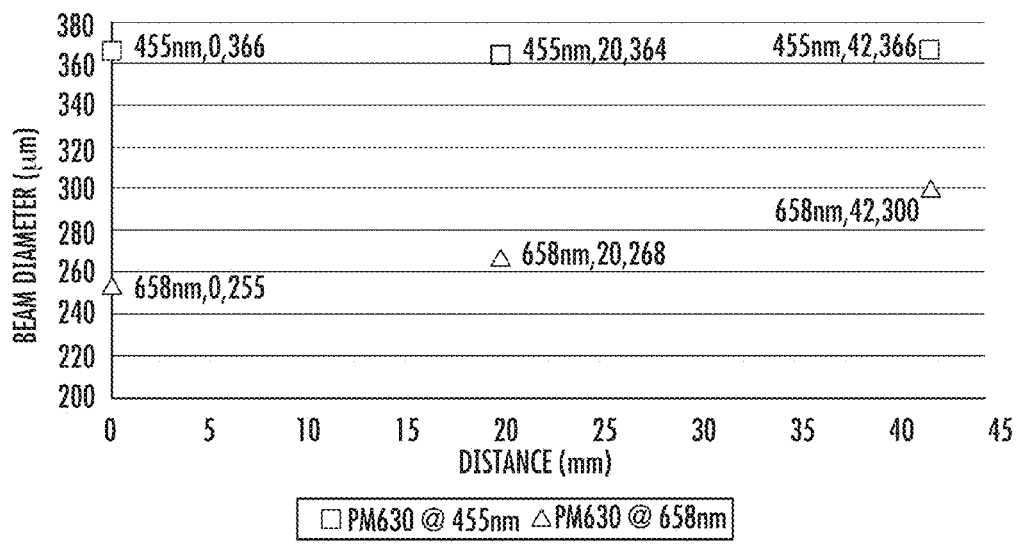
FIG. 6 is a plot of beam diameter (in µm) vs. distance (in mms) for a collimator constructed using PM460 fibre.

FIG. 6 is a plot of beam diameter (in μm) vs. distance from a collimator (in mms) constructed with PM460 fibre. The PM 460 fibre (with both 455 nm and 658 nm conventionally both above cut-off) produced a collimated beam at 455 nm (the alignment wavelength), but this collimator has significant divergence (about 40 μm/40 mm=1 μm/mm 1 mrad may be more appropriate) at 568 nm shown in FIG. 6. This change in divergence with change in wavelength can have major consequences for the free space coupling efficiency of light between two collimators.

Disclosed embodiments are useful for fibre coupled AOTFs. However, as disclosed above, disclosed embodiments are generally applicable to all broadband fibre-to-fibre coupled devices including broadband filters, isolators and delay lines, as well as optical communication systems.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A method of free space fibre-to-fibre coupling, comprising:
providing a first optical fibre and a second optical fibre spaced apart from one another by a free space distance having a pair of spaced-apart achromatic collimating lenses within said free space distance, and
launching essentially single mode light from said first optical fibre at a wavelength λ or a range of λs that provides at least a portion of its light at wavelength(s) below a cut-off wavelength for said first optical fibre,
wherein said first optical fibre and said second optical fibre are both <50 m and sufficiently short to provide essentially single mode operation, and
wherein said essentially single mode light after said launching propagates as free space light through said free space distance and is received by and propagates in said second optical fibre as said essentially single mode light.

2. The method of claim 1, wherein said first optical fibre and said second optical fibre are essentially identical fibres, and a core diameter of said first optical fibre and said second optical fibre are both less than (<) 12 μm.

3. The method of claim 1, wherein said essentially single mode light provided by a narrowband laser source providing said essentially single mode light at said wavelength λ.

4. The method of claim 3, wherein said wavelength λ is at least (≥) 50 nm below said cut-off wavelength for said first optical fibre and said second optical fibre.

5. The method of claim 1, further comprising an optical device between said pair of spaced-apart achromatic collimating lenses.

6. The method of claim 5, wherein said essentially single mode light provided by a broadband light source having a bandwidth of at least 100 nm and said optical device comprises an acousto-optic tunable filter (AOTF).

7. The method of claim 1, wherein said first optical fibre and said second optical fibre both comprise polarization-maintaining (PM) optical fibres.

8. A fibre-coupled optical system, comprising:
a first optical fibre and a second optical fibre spaced apart from one another by a free space distance;
a first achromatic collimating lens associated with said first optical fibre and a second achromatic collimating lens associated with said second optical fibre both within said free space distance;
at least one optical device between said first achromatic collimating lens and said second achromatic collimating lens, and
a light source providing essentially single mode light at a wavelength λ or a range of said λs that provides at least a portion of its light at wavelength(s) below a cut-off wavelength for said first optical fibre aligned for launching into said first optical fibre;
wherein said first optical fibre and said second optical fibre are both <50 m and sufficiently short to provide essentially single mode operation,
wherein said essentially single mode light launched into said first optical fibre propagates as free space light through said free space distance and is received by and propagates in said second optical fibre as said essentially single mode light.

9. The system of claim 8, wherein said first optical fibre and said second optical fibre are essentially identical fibres, and a core diameter of said first optical fibre and said second optical fibre are both less than (<) 12 μm.

10. The system of claim 8, wherein said light source comprises a narrowband laser source providing said essentially single mode light at said wavelength λ.

11. The system of claim 10, wherein said wavelength λ is at least (≥) 50 nm below said cut-off wavelength for said first optical fibre and said second optical fibre.

12. The system of claim 8, wherein said light source comprises a broadband light source having a bandwidth of at least 100 nm and said optical device comprises an acousto-optic tunable filter (AOTF).

13. The system of claim 8, wherein said first optical fibre and said second optical fibre both comprise polarization-maintaining (PM) optical fibres.

* * * * *